J K FLIP-FLOP

INVENTORS
ALAN E. POUND
DOV BORNSTEIN

VERSATILE LOGIC CIRCUIT MODULE
Filed Aug. 25, 1966 10 Sheets-Sheet 2
Fig-4 T FLIP-FLOP
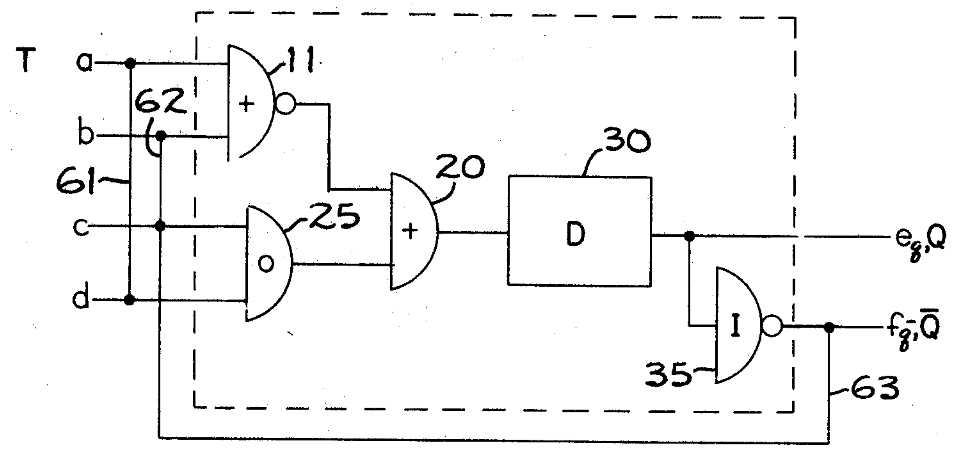
Fig-5
TIMING DIAGRAM
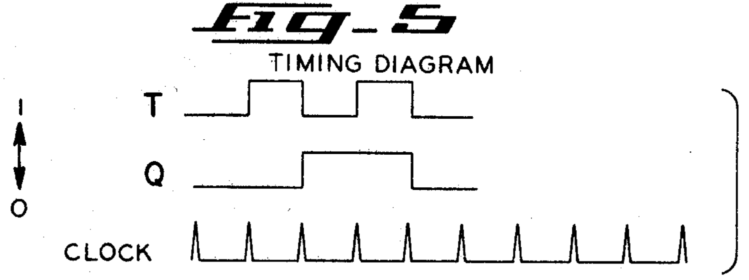
Fig-6 J̄ K̄ FLIP-FLOP
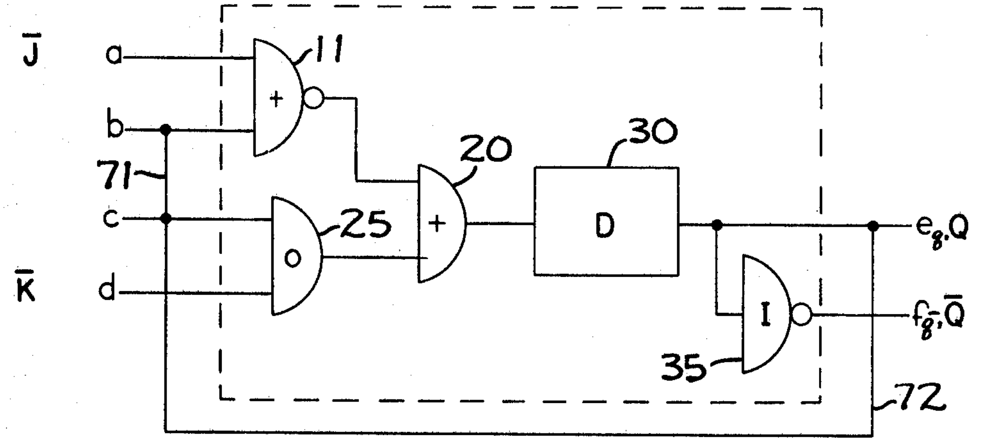
INVENTORS
ALAN E. POUND
DOV BORNSTEIN VERSATILE LOGIC CIRCUIT MODULE
FIG. 7
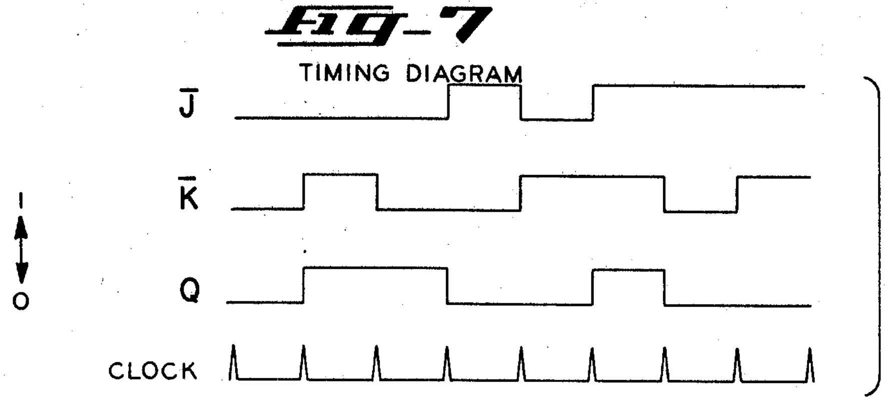
FIG. 8 T̄ FLIP-FLOP
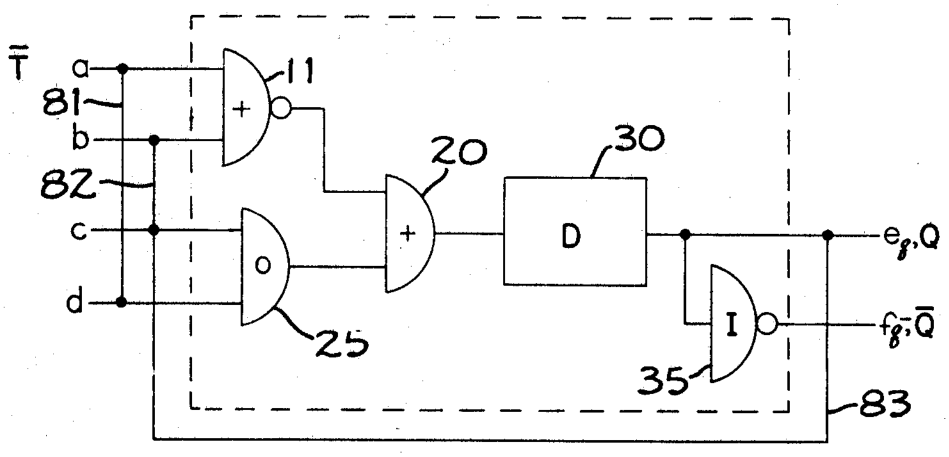
FIG. 9
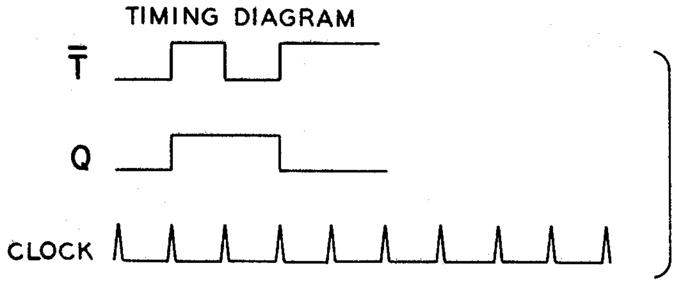
INVENTORS
ALAN E. POUND
DOV BORNSTEIN VERSATILE LOGIC CIRCUIT MODULE
Filed Aug. 25, 1966 10 Sheets-Sheet 4
Fig. 10 R S FLIP-FLOP
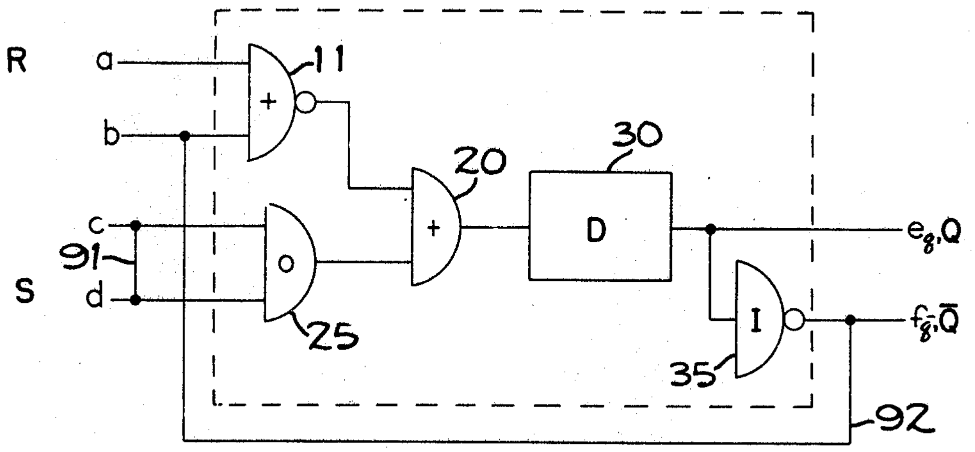
Fig. 11 SET OVERRIDE
TIMING DIAGRAM
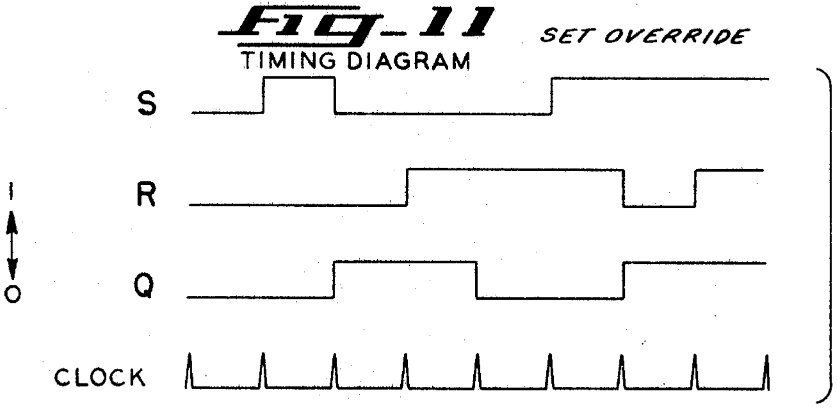
Fig. 12 RESET OVERRIDE
TIMING DIAGRAM
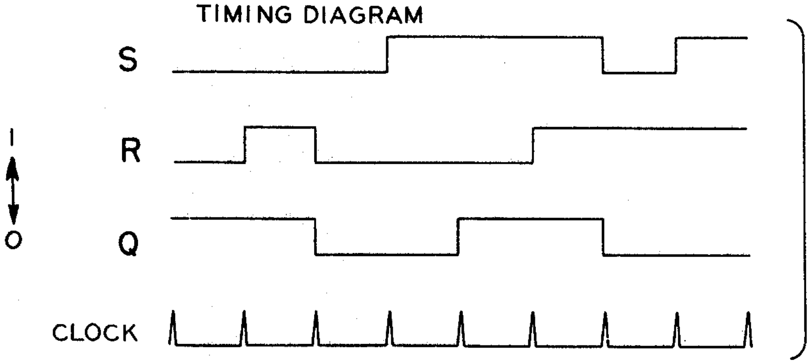
INVENTORS
ALAN E. POUND
DOV BORNSTEIN FIG. 13 R̄ S̄ FLIP-FLOP
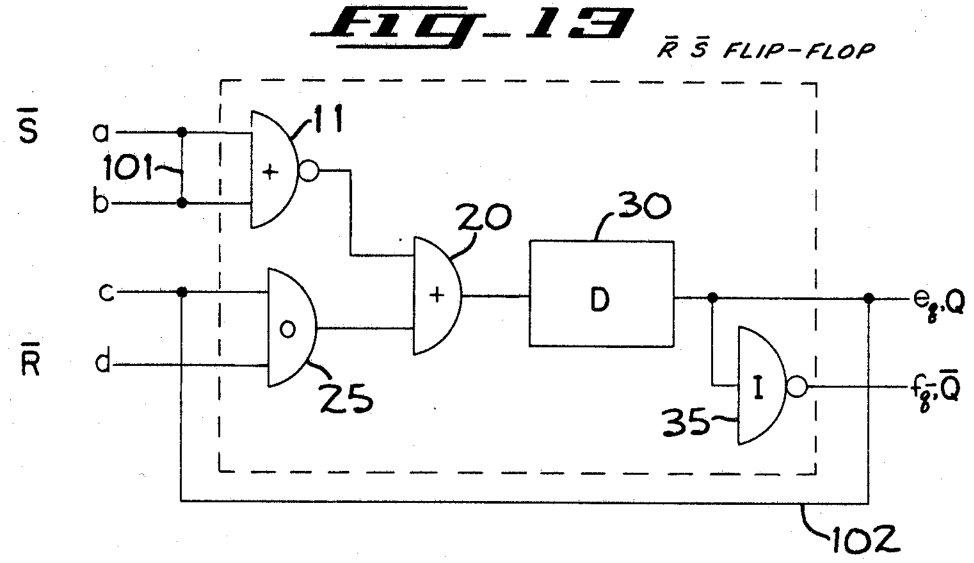
FIG. 14 SET OVERRIDE
TIMING DIAGRAM
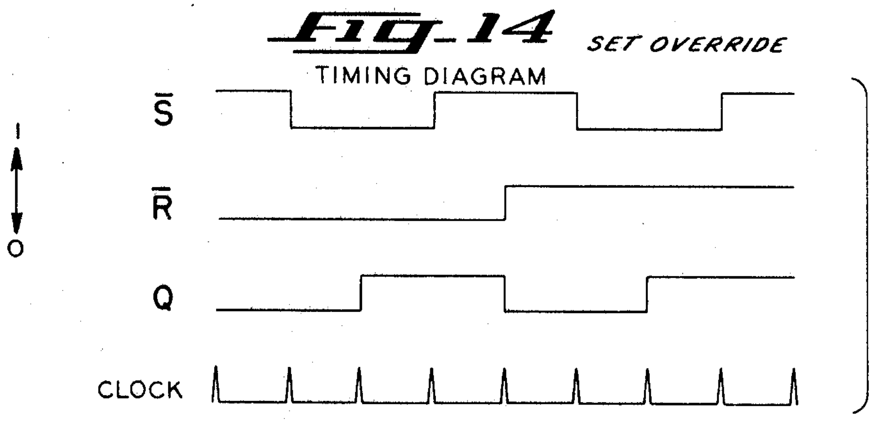
FIG. 15 RESET OVERRIDE
TIMING DIAGRAM
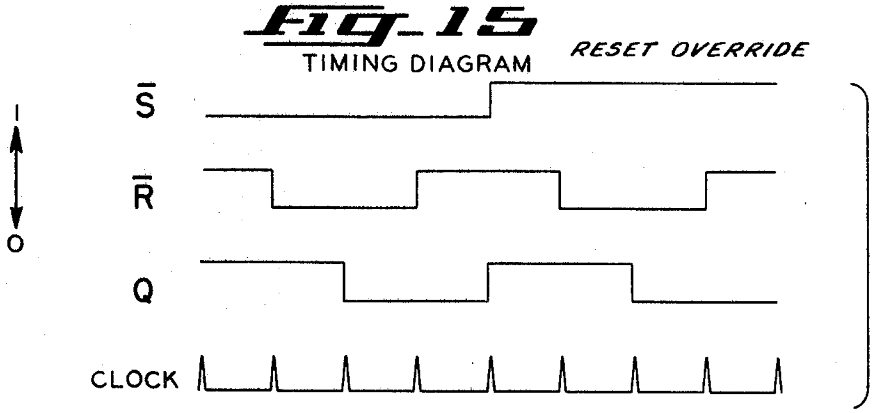
INVENTORS
ALAN E. POUND
DOV BORNSTEIN FIG. 16 SAMPLE AND HOLD FLIP-FLOP
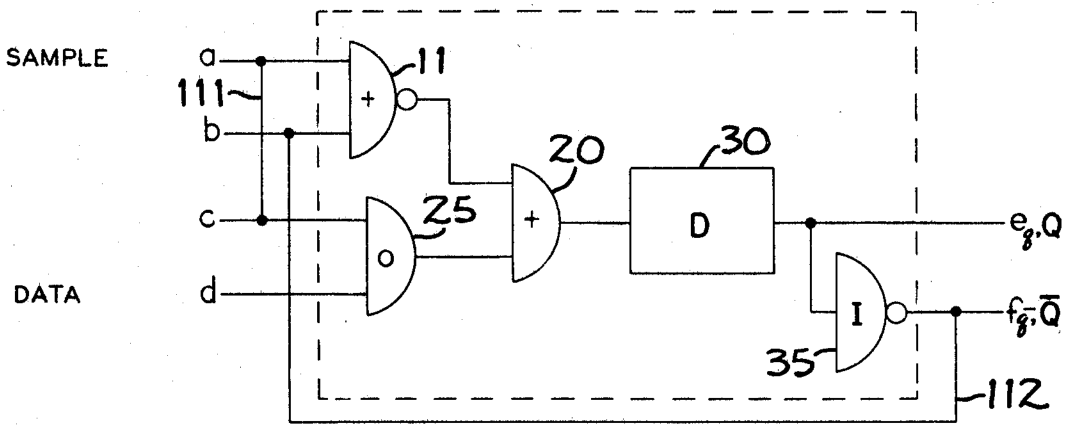
FIG. 17 TIMING DIAGRAM
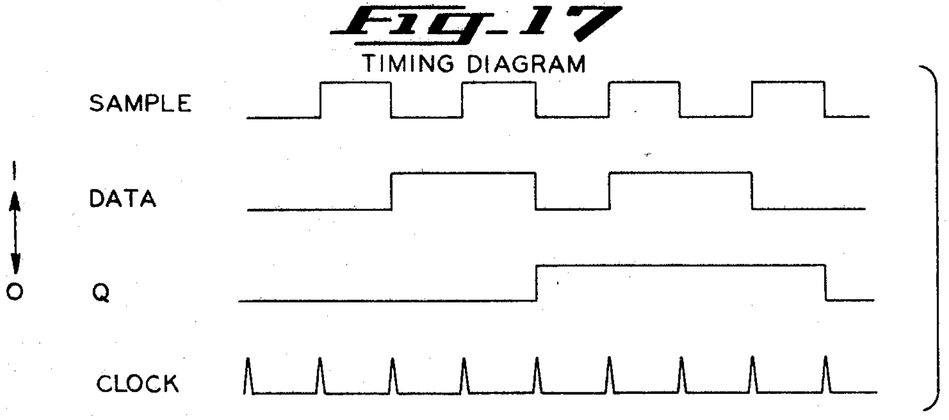
FIG. 18 INVERTED INPUT SAMPLE AND HOLD FLIP-FLOP
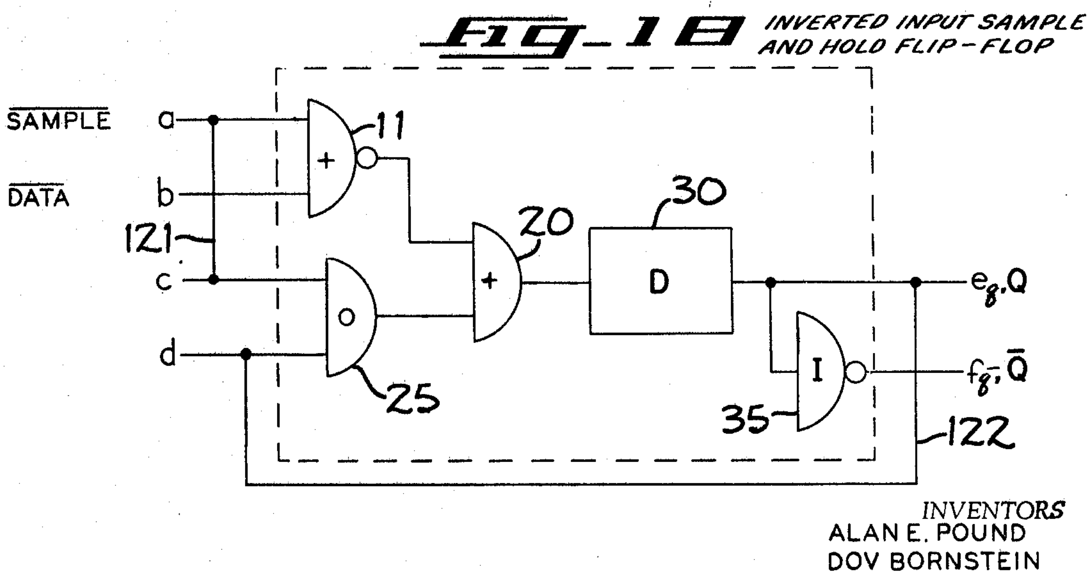
INVENTORS
ALAN E. POUND
DOV BORNSTEIN FIG. 19
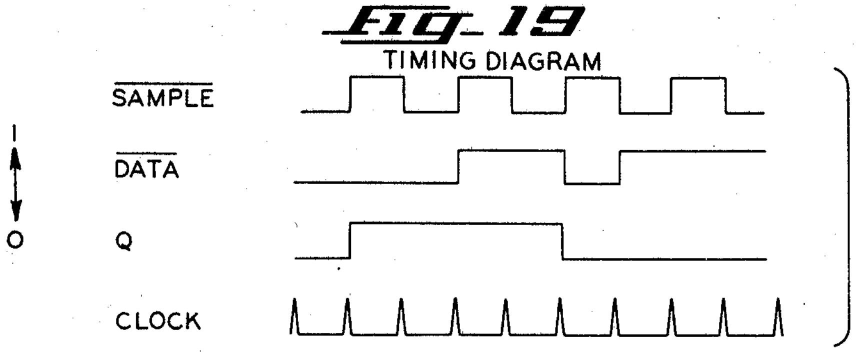
FIG. 20 ONE BIT DELAY FLIP-FLOP
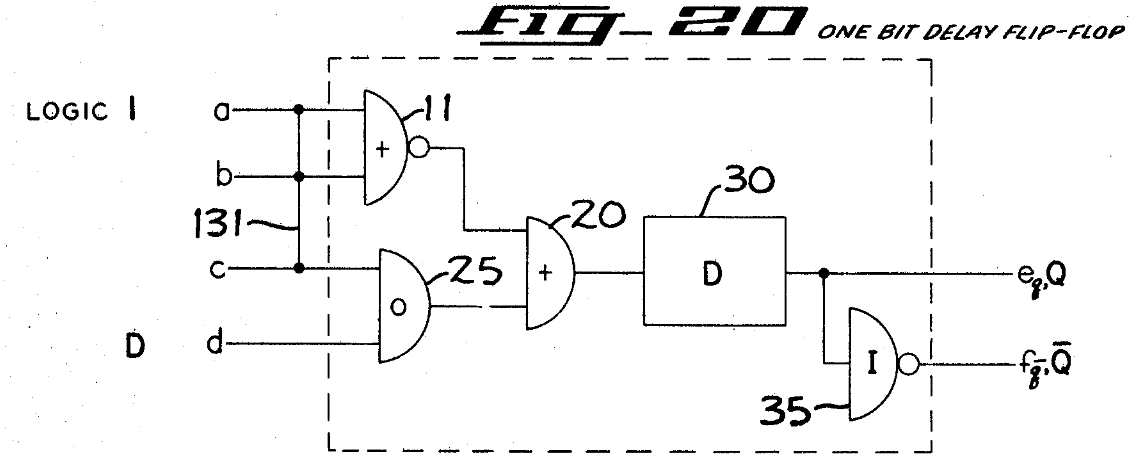
FIG. 21
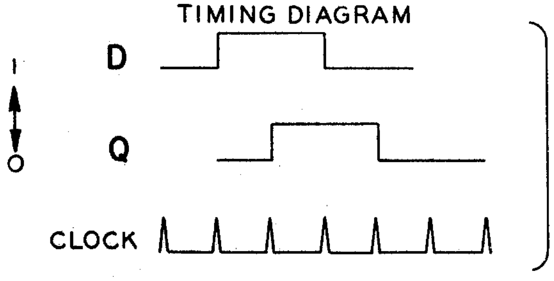
INVENTORS
ALAN E. POUND
DOV BORNSTEIN FIG. 22 ONE BIT DELAY COMPARATOR
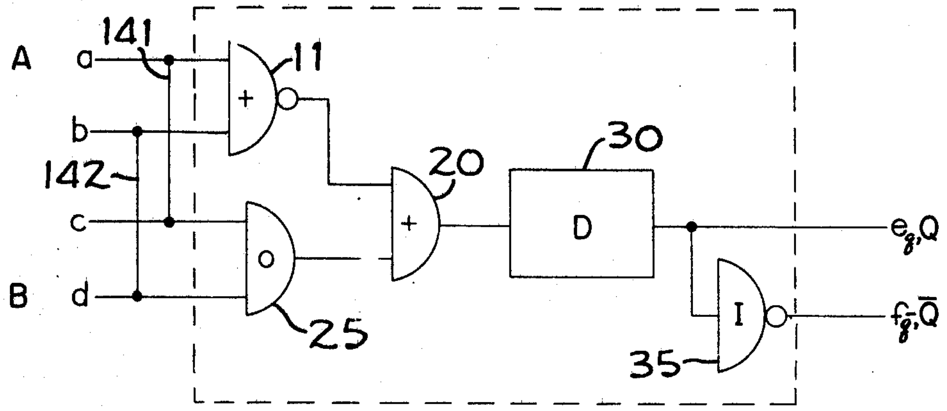
FIG. 23 A B COMPARATOR
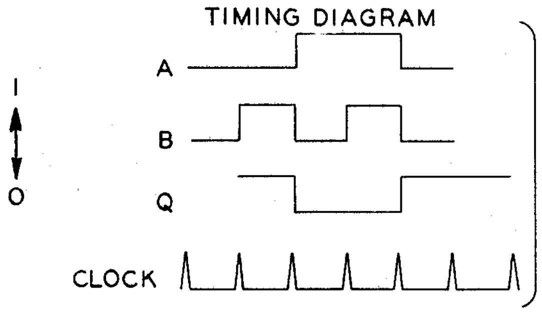
FIG. 24 $\bar{A}$ B COMPARATOR
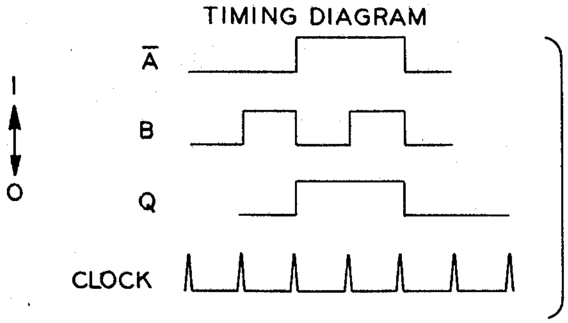
INVENTORS
ALAN E. POUND
DOV BORNSTEIN FIG. 25 ONE BIT DELAY TWO STREAM SELECTOR
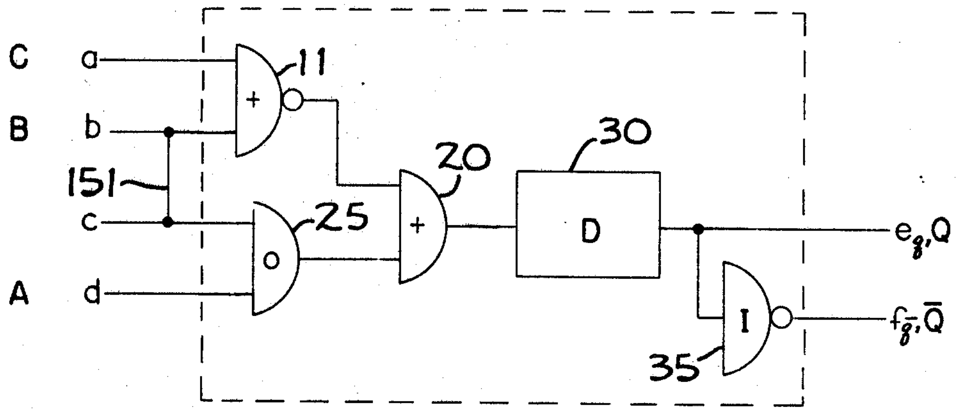
FIG. 26
TIMING DIAGRAM
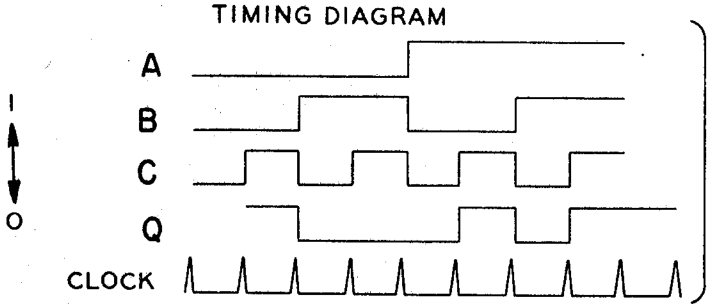
INVENTORS
ALAN E. POUND
DOV BORNSTEIN

CIRCUIT DIAGRAM OF BASIC LOGIC DELAY CIRCUIT

INVENTORS
ALAN E. POUND
DOV BORNSTEIN

United States Patent Office 3,510,787

Patented May 5, 1970

3,510,787

VERSATILE LOGIC CIRCUIT MODULE

Alan E. Pound, Sunnyvale, and Dov Bornstein, San Jose, Calif., assignors, by mesne assignments, to Philco-Ford Corporation, a corporation of Delaware Filed Aug. 25, 1966, Ser. No. 575,073

Int. Cl. H03k *3/12*

U.S. Cl. 328—206 19 Claims

ABSTRACT OF THE DISCLOSURE

A circuit module which can perform different logic functions when connections between its four input terminals, and between said input terminals and its two output terminals, are varied. The module can provide JK, T, $\overline{JT}$, $\overline{T}$, RS, $\overline{RS}$, sample and hold, and one-bit delay flip-flops, plus comparator and two stream selector circuits. The four input terminals of the basic module are provided by the input terminals of a two-input NOR gate and a two-input AND gate. The outputs of the NOR and AND gates are connected to the inputs of a two-input OR gate whose output is connected to the input of a one-bit delay circuit. The output of the delay circuit provides one output terminal of the module and an inverted output of the delay circuit provides the other output terminal of the module.

The present invention relates to a versatile logic circuit module which can be easily adapted to perform flip-flop, comparator, and selector logic functions and the like.

Heretofore, flip-flop, comparator, and selector logic circuits had ether one or two input terminals and were limited in operation to performing a single logic function. To perform more than a single logic function, additional external elements such as active components, gate circuits, or the like, were required.

An object of the present invention is to provide a logic circuit module which can perform more than a single logic function without additional external elements.

Another object is to provide a circuit module wherein the logic functions performed thereby can be changed by changing the input connections, output connections, and feedback connections of the module.

Other and further objects and advantages of the present invention will be apparent to one skilled in the art from the following description taken in conjunction with the accompanying drawings.

DRAWINGS

FIG. 4 is a schematic diagram of a T flip-flop incorporating the logic module.

FIG. 5 is a diagrammatic illustration of input and output signals of the T flip-flop.

FIG. 6 is a schematic diagram of a $\overline{JK}$ flip-flop embodying the logic module.

FIG. 7 is a diagrammatic illustration of input and output signals of the $\overline{JK}$ flip-flop.

FIG. 8 is a schematic diagram of a $\overline{T}$ flip-flop employing the logic module.

FIG. 9 is a diagrammatic illustration of input and output signals of the $\overline{T}$ flip-flop.

FIG. 10 is a schematic diagram of an RS (reset-set) flip-flop which employs set override and which incorporates the logic module.

FIG. 11 is a diagrammatic illustration of input and output signals of the flip-flop of FIG. 10.

FIG. 12 is a diagrammatic illustration of input and output signals of the flip-flop of FIG. 10 when employing reset override with its input and output connections reversed.

FIG. 13 is a schematic diagram of an $\overline{RS}$ ($\overline{\text{reset-set}}$) flip-flop which employs set override and which incorporates the logic module.

FIG. 14 is a diagrammatic illustration of input and output signals of the flip-flop of FIG. 13.

FIG. 15 is a diagrammatic illustration of input and output signals of the flip-flop of FIG. 13 when employing reset override with its input and output connections reversed.

FIG. 16 is a schematic diagram of a sample and hold flip-flop employing the logic module.

FIG. 17 is a diagrammatic illustration of input and output signals of the flip-flop of FIG. 16.

FIG. 18 is a schematic diagram of an inverted input sample and hold flip-flop incorporating the logic module.

FIG. 19 is a diagrammatic illustration of input and output signals of the flip-flop of FIG. 18.

FIG. 20 is a schematic diagram of a one-bit delay flip-flop employing the logic module.

FIG. 21 is a diagrammatic illustration of input and output signals of the flip-flop of FIG. 20.

FIG. 22 is a schematic diagram of a one-bit delay comparator employing the logic module.

FIG. 23 is a diagrammatic illustration of input and output signals of the circuit of FIG. 22 when employed as an AB comparator.

FIG. 24 is a diagrammatic illustration of input and output signals of the circuit of FIG. 22 when employed as an $\overline{A}$B comparator.

FIG. 25 is a schematic diagram of a one-bit delay two-stream selector incorporating the logic module.

FIG. 26 is a diagrammatic illustration of input and output signals of the selector of FIG. 25.

FIG. 1.—BASIC LOGIC MODULE

Figure 1:
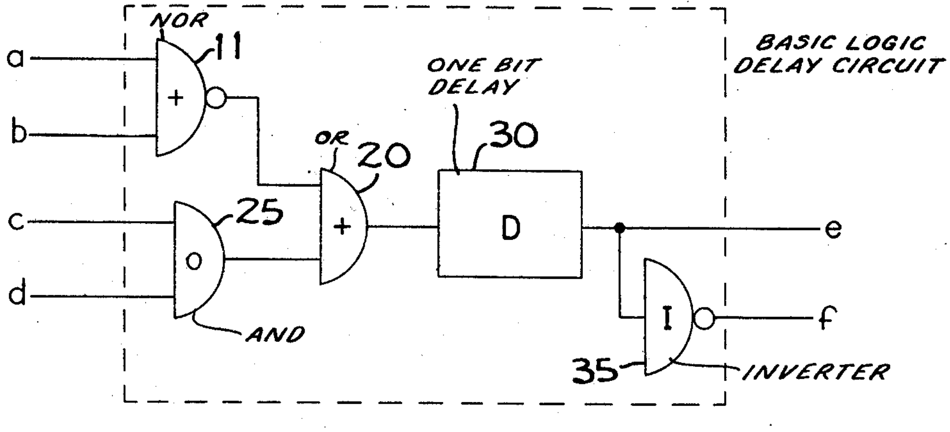
FIG. 1 is a schematic diagram of the logic module of the present invention.

The logic module of the present invention comprises a conventional NOR circuit 11 with two inputs *a* and *b*. The output of NOR circuit 11 is connected to an input of a conventional OR circuit 20. Connected to the other input of OR circuit 20 is the output of a conventional AND circuit 25. AND circuit 25 has two inputs *c* and *d*. Connected to the output of OR circuit 20 is an input of a one-bit delay circuit 30 which has an output *e*. Also connected to the output of delay circuit 30 is the input of a conventional inverter 35. The output *f* of inverter 35 supplies an output signal inverted from that supplied by output *e*. Thus the logic module includes four inputs *a*, *b*, *c*, and *d*, and two outputs *e* and *f*.

In operation, AND circuit 25 will produce a logic one signal (ONE) at its output only when both of its inputs receive ONES. Should there be a logic zero signal (ZERO) on either or both of its inputs, it output will be a ZERO.

NOR circuit 11 operates as an OR circuit with its output inverted. Thus, if either OR both of its inputs receive ONES, then its output will be a ZERO. If both of its inputs receive ZEROES, then its output will be a ONE.

If both inputs of OR circuit 20 receive ZEROES, its output will be ZERO. If either or both of its inputs receive a ONE, then its output will be a ONE.

Figure 3:
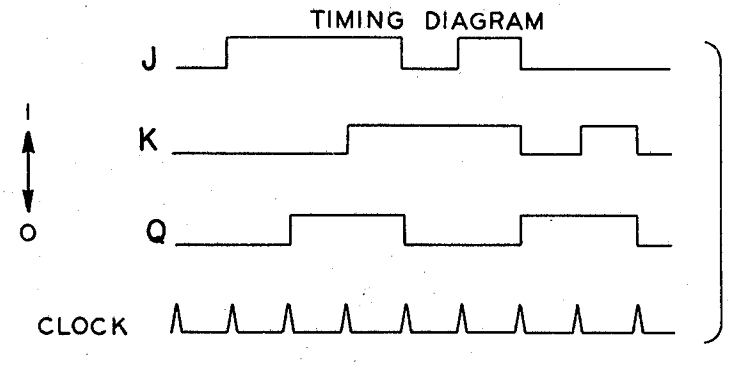
FIG. 3 is a diagrammatic illustration of input and output signals of the JK flip-flop.

Delay circuit 30 is a conventional one-bit delay circuit. The period of the clock pulses of FIG. 3 indicate the delay provided by circuit 30.

Inverter 35 is conventional; if a ONE is impressed on its input, a ZERO will be supplied at its output, and vice-versa.

In operation of the module, if ZEROES are supplied to terminals *a* and *b* and/or ONES are supplied to terminals *c* and *d*, either or both inputs of OR circuit 20 will receive ONES so that one bit time later, delay circuit 30 will supply a ONE on terminal *e* and inverter 35 will respectively supply a ZERO on terminal *f*.

If a ONE is supplied to either or both terminals *a* and *b* and a ZERO is supplied to either or both terminals *c* and *d*, ZEROES will appear on both inputs of OR circuit 20 so that one bit time later delay circut 30 will supply a ZERO output on terminal *e* and inverter 35 will supply a ONE on terminal *f*.

FIGS. 2–3.—JK FLIP-FLOP

Figure 2:
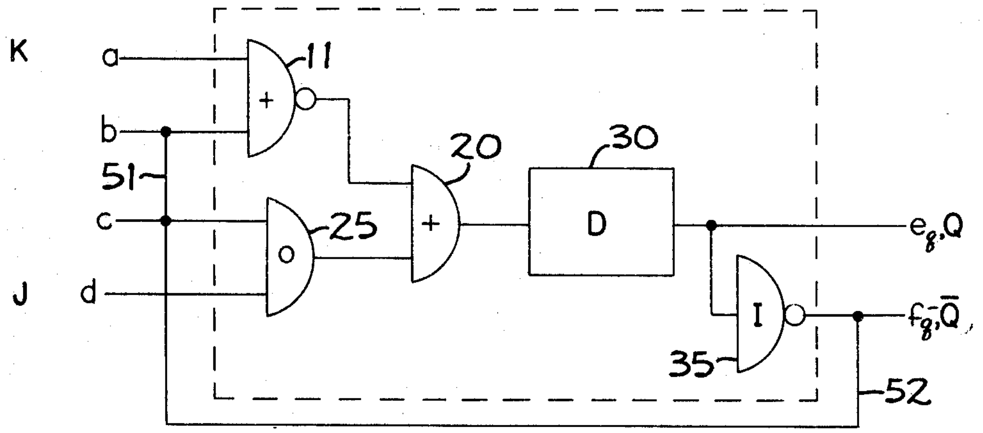
FIG. 2 is a schematic diagram of a JK flip-flop employing the logic module.

Illustrated in FIG. 2 is the logic module connected to perform the JK flip-flop function. In a JK flip-flop, if the J and K inputs receives ZEROES, then the output remains the same. If the J input receives a ONE and the K input receives a ZERO, then the flip-flop will be set and produces a ONE on the normal, or Q, output. Should the K input be a ONE and the J input be a ZERO, then the flip-flop will be reset and thereby produce a ZERO on the normal output. On the other hand, in the event the J input is a ONE and the K input is a ZERO, then the prior output will be complemented, whether it was a ONE or a ZERO.

To achieve those results with the module of the invention, the K input is supplied to terminal *a* to be fed to one input of NOR circuit 11. The other input *b* of NOR circuit 11 is connected to input *c* of AND circuit 25 by a conductor 51. Conductor 51 is connected to a feedback connection 52 which is connected to the output of inverter 35. The J input is supplied to *d*, the other input of AND circuit 25.

In all subsequent explanations, the *existing* signals which appear on output terminals *e* and *f* prior to the application of input signals to the logic module will be designated by the lower case terms *q* and $\overline{q}$, respectively. The *resultant* signals which appear on these output terminals one bit time after application of input signals will be designated by the upper case terms Q and $\overline{Q}$, respectively. Both the lower and upper case designations are indicated on each relevant drawing figure at the appropriate locations.

The operation of the JK flip-flop is represented mathematically by the formula:

$$Q=\overline{K+\overline{q}}+J\overline{q}$$

The following truth table describes the operation of the flip-flop:

| $\overline{q}$ | J | K | Q |
|---|---|---|---|
| 0 | 0 | 0 | 1 |
| 0 | 0 | 1 | 0 |
| 0 | 1 | 0 | 1 |
| 0 | 1 | 1 | 0 |
| 1 | 0 | 0 | 0 |
| 1 | 0 | 1 | 0 |
| 1 | 1 | 0 | 1 |
| 1 | 1 | 1 | 1 |

Assume the output ($\overline{q}$) of inverter 35 is a ZERO and that ZEROES are supplied to the J and K inputs. ZEROES will be fed to the inputs of NOR circuit 11, which will produce a ONE output. ZEROES also will be fed to the inputs of AND circuit 25, which will produce a ZERO output. As a consequence, a ONE will be produced at the output of OR circuit 20. After delay, circuit 30 produces the ONE in the output thereof and a ZERO is produced in the output of inverter 35. Under the above conditions no change in output occurs.

When input K is changed from a ZERO to a ONE and the other conditions remain the same, the following events occur. The output of AND circuit 25 will be a ZERO. The inputs of NOR circuit 11 will receive a ONE and a ZERO, causing ZERO to be produced in the output of NOR circuit 11. Therefore a ZERO will be produced in the output of OR circuit 20. After delay, circuit 30 will supply a ZERO on terminal *e* and, due to inverter 35, a ONE will appear on terminal *f*. Thus the flip-flop is reset.

At this time, assume that input J receives a ONE and input K receives a ZERO. Since a ZERO is supplied to input *a* (K) and a ONE is supplied to input *b* (J), NOR circuit 11 will produce a ZERO at the output thereof. AND circuit 25 will receive ONES on both of its inputs, causing ONE to be produced in its output. Accordingly, a ZERO and a ONE will be fed to the inputs of OR circuit 20, which results in a ONE being produced in the output of the OR circuit. After delay, circuit 30 supplies the ONE on terminal *e*, while a ZERO will be supplied to terminal *f*. Thus the flip-flop will be set.

Now assume that $\overline{q}$ is a ZERO, the K input receives a ONE, and the J input receives a ONE. NOR circuit 11 will produce a ZERO output while AND circuit 25 will also produce a ZERO output. As a result, the output produced by OR circuit 20 will be a ZERO. Delay circuit 30 thereafter supplies the ZERO on terminal *e* and inverter 35 supplies a ONE on terminal *f*. Thus the output of the flip-flop has been complemented.

Assume now that the inputs J and K are both ONES and the output on terminal *f* ($\overline{q}$) is a ONE. Under these conditions, the output of NOR circuit 11 will be a ZERO and the output of AND circuit 25 will be a ONE. Therefore, the output of OR circuit 20 will be a ONE. Delay circuit 30 thereafter supplies the ONE on terminal *e* and a ZERO will appear on terminal *f*. Thus the output of the flip-flop will be complemented when both inputs J and K receive ONES.

Next assume that *f* receives a ONE and that inputs J and K receive ZEROES. The output from NOR circuit 11 will be a ZERO and the output from AND circuit 25 also will be a ZERO. Therefore the output from OR circuit 20 will be a ZERO. After delay, circuit 30 supplies the ZERO on terminal *e* and inverter 35 transmits a ONE on terminal *f*. Thus, the state of the flip-flop does not change.

FIGS. 4–5.—T FLIP-FLOP

FIG. 4 illustrates the logic module connected to perform the T or trigger flip-flop function. In a T flip-flop, a ZERO input does not change the output. On the other hand, a ONE input will cause the output of the flip-flop to be complemented.

In the T flip-flop input *a* is connected to input *d* by a conductor 61 and input *b* is connected to input *c* by a conductor 62. Thus the inputs of NOR circuit 11 are connected respectively to inputs of AND circuit 25. Also, inputs *b* and *c*, and therefore an input of NOR circuit 11 and an input of AND circuit 25, are connected to the output of inverter 35 by a feedback connection 63. The T input is supplied to terminal *a*. Essentially the T flip-flop circuit is structural similar to the JK flip-flop except that the J and K inputs are interconnected.

The operation of the T flip-flop is represented mathematically by the formula:

$$Q=\overline{T+\overline{q}}+T\overline{q}$$

The following truth table describes the operation of the flip-flop:

| $\overline{q}$ | T | Q |
|---|---|---|
| 0 | 0 | 1 |
| 0 | 1 | 0 |
| 1 | 0 | 0 |
| 1 | 1 | 1 |

Assume the output on terminal *f* is a ZERO and that the T input receives a ZERO. The output of NOR circuit 11 will be a ONE and the output of AND circuit 25 will be a ZERO. Accordingly, the output of OR circuit 20 will be a ONE. After delay, circuit 30 supplies a ONE on terminal *e* and a ZERO on terminal *f*. Thus, a ZERO input does not change the output of the flip-flop.

Now assume the T input remains a ZERO but the output *f* is now a ONE. As a consequence, the output of NOR circuit 11 will now be a ZERO and the output of AND circuit 25 will be a ZERO. Therefore the output of OR circuit 20 will be a ZERO. Delay circuit 30 will thereafter supply the ZERO on output *e* and inverter 35 will supply a ONE on terminal *f*. Hence, a ZERO input does not change the output of the flip-flop.

Next assume that the T input is a ONE and the output at terminal *f* is a ZERO. NOR circuit 11 will produce a ZERO output while AND circuit 25 will also produce a ZERO output. Consequently a ZERO is supplied by OR circuit 20 to delay circuit 30. After delay, circuit 30 transmits the ZERO on terminal *e* and inverter 35 causes a ONE to appear on terminal *f*. Hence a ONE input causes the output to be complemented.

Now assume that the T input is again a ONE and the signal on terminal *f* is also a ONE. The output of NOR circuit 11 will be a ZERO and the output of AND circuit 25 will be a ONE. Thus OR circuit 20 supplies a ONE output. Delay circuit 20 supplies the ONE one bit time later on output *e* and inverter 35 will cause a ZERO to appear on terminal *f*. Hence a ONE input causes the output to be inverted.

FIG. 6.—$\overline{JK}$ FLIP-FLOP

Illustrated in FIG. 6 is a $\overline{JK}$ flip-flop employing the logic module. In the $\overline{JK}$ flip-flop, the $\overline{J}$ input (FIG. 7) is supplied to input *a*, inputs *b* and *c* are connected by a conductor 71 so that an input of NOR circuit 11 will be connected to an input of AND circuit 25. The $\overline{K}$ input (FIG. 7) is supplied to input *d*. Connected to inputs *b* and *c* is a feedback connection 72.

The operation of the $\overline{JK}$ flip-flop is mathematically represented by the formula:

$$Q=\overline{\overline{J}+q}+\overline{K}q$$

The truth table for the flip-flop is as follows:

| q | $\overline{J}$ | $\overline{K}$ | Q |
|---|---|---|---|
| 0 | 0 | 0 | 1 |
| 0 | 0 | 1 | 1 |
| 0 | 1 | 0 | 0 |
| 0 | 1 | 1 | 0 |
| 1 | 0 | 0 | 0 |
| 1 | 0 | 1 | 1 |
| 1 | 1 | 0 | 0 |
| 1 | 1 | 1 | 1 |

The operation of the $\overline{JK}$ flip-flop is similar to the operation of the JK flip-flop. Both provide the same function (i.e. that of a JK flip-flop). The JK flip-flop operates with J and K input signals, while the $\overline{JK}$ flip-flop operates with complemented J ($\overline{J}$) and complemented K ($\overline{K}$) input signals.

In operation, the inputs are inverted and the feedback (*q*) is taken from the output of delay circuit 30 instead of inverter 35. The operation of the logic module does not change, which demonstrates the flexibility of the module for inverted input signals.

FIG. 8—$\overline{T}$ FLIP-FLOP

FIG. 8 illustrates a $\overline{T}$ flip-flop employing the logic module. In the $\overline{T}$ flip-flop, the $\overline{T}$ input (FIG. 9) is supplied to terminal *a* and one terminal *d* of AND circuit 25 by way of a conductor 81. The other terminal *b* of NOR circuit 11 is connected to the other terminal *c* of AND circuit 25 by a conductor 82. A feedback connection 83 interconnects the output of delay circuit 30 with conductor 82.

The operation of the $\overline{T}$ flip-flop is mathematically represented by the formula:

$$Q=\overline{\overline{T}+q}+\overline{T}q$$

The truth table for the flip-flop is as follows:

| q | $\overline{T}$ | Q |
|---|---|---|
| 0 | 0 | 1 |
| 0 | 1 | 0 |
| 1 | 0 | 0 |
| 1 | 1 | 1 |

The operation of the $\overline{T}$ flip-flop is similar to the operation of the T flip-flop. Both provide the same function (i.e. that of a trigger flip-flop). The T flip-flop operates with a T input, while the $\overline{T}$ flip-flop circuit 60 operates with a complemented T ($\overline{T}$) input. In operation, the input is inverted and the feed (*q*) is taken from the output of delay circuit 30 instead of inverter 35.

FIG. 10.—RS FLIP-FLOP

Illustrated in FIG. 10 is the logic module connected to perform the RS (reset-set) flip-flop function with set override. In an RS flip-flop, if the R (reset) input and the S (set) input both receive ZEROS, the output remains the same. If the S input receives a ONE and the R input receives a ZERO, the flip-flop will be set and produce a ONE output. Should the R input be a ONE and the S input be a ZERO, the flip-flop will go to a reset state with a ZERO output. Should the R input signal be a ONE and the S input be a ONE, then the set override functions to set the flip-flop to a ONE output.

The R input (FIG. 11) is supplied to terminal *a* and the S input (FIG. 11) is supplied to terminal *d*. Terminals *c* and *d* of AND circuit 25 are connected by a conductor 91. A feedback connection 92 connects output *f* of inverter 35 with terminal *b*.

The operation of the RS flip-flop is represented mathematically by the formula:

$$Q=\overline{R+\overline{q}}+S$$

A truth table for the flip-flop is as follows:

| $\overline{q}$ | S | R | Q |
|---|---|---|---|
| 0 | 0 | 0 | 1 |
| 0 | 0 | 1 | 0 |
| 0 | 1 | 0 | 1 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

Assume that the *f* output ($\overline{q}$) is a ZERO and that inputs R and S are both ZEROS. A ONE will be produced at the output of NOR circuit 11 and a ZERO will be produced at the output of AND circuit 25. As a result, a ONE will be produced at the output of OR circuit 20. After delay, circuit 30 supplies the ONE on terminal *e* and inverter 35 supplies a ZERO on terminal *f*. Under the above conditions, no change in output occurred.

Now assume that the output *f* of inverter 35 ($\overline{q}$) is a ONE and inputs R and S receive ZEROS. NOR circuit 11 will produce a ZERO output while AND circuit also will produce a ZERO output. Therefore the output of OR circuit 20 will be a ZERO. After delay, ZERO will appear on terminal *e* and a ONE will appear on terminal *f*. Hence no change in the output occurred.

Next, assume that $\overline{q}$ is a ONE, input, S receives a ONE, and input R receives a ZERO. The output of NOR circuit 11 will be a ZERO, and the output of AND circuit 25 will be a ONE. Thus the output of OR circuit 20 will be a ONE. After a delay, circuit 30 supplies the ONE to terminal *e* and inverter 35 causes a ZERO to appear at terminal *f*. The same result will occur should $\overline{q}$ be a ZERO because the output of NOR circuit 11 will be a ONE. Thus an S input of ONE and an R input of ZERO sets the flip-flop to produce a ONE at its output (*e*).

Assume that $\bar{q}$ is a ZERO, R is a ONE, and S is a ZERO. NOR circuit 11 will produce a zero output and while AND circuit 25 will also produce a ZERO output. Hence OR circuit 20 produces a ZERO output. After delay the ZERO will appear on terminal *e* and the ONE will appear on terminal *f*. The same result occurs when *f* ($\bar{q}$) is a ONE. Hence an R input of ONE and an S input of ZERO resets the flip-flop.

For operating the RS flip-flop with set override for producing a ONE output, the R input is a ONE and the S input is a ONE. The $\bar{q}$ output may be either a ONE or a ZERO. Assume that it is a ONE. Then the output of NOR circuit 11 will be a ZERO and the output of AND circuit 25 will be a ONE. Accordingly the output of OR circuit 20 will be a ONE. After delay in circuit 30, the ONE will appear on terminal *e* and a ZERO will appear on terminal *f*.

In an RS flip-flop with reset override, the operation is similar to that described with set override except that an R input of ONE and an S input of ONE resets the RS flip-flop to produce an output of ZERO on terminal *e*.

To provide an RS flip-flop with reset override, the S input is fed to terminal *a* and the R input to terminal *d*. The circuit remains the same except that output Q is taken from the terminal *f* and output $\overline{Q}$ is taken from terminal *e*.

The operation of the RS flip-flop with reset override is represented mathematically by the formula:

$$Q=\overline{\overline{S \,\&\, q}+R}$$

A truth table for the flip-flop with reset override is as follows:

| q | S | R | Q |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 1 |
| 1 | 1 | 1 | 0 |

The RS flip-flop with reset override operates in the manner described for the RS flip-flop with set override, except that when R and S receive ONES, the output (Q) is reset to a ZERO.

FIG. 13.—$\overline{\text{RS}}$ FLIP-FLOP

Illustrated in FIG. 13 is an $\overline{\text{RS}}$ flip-flop with set override. In the $\overline{\text{RS}}$ flip-flop, the $\overline{\text{S}}$ ($\overline{\text{set}}$) input (FIG. 14) is supplied to terminal *a*, terminals *a* and *b* are connected by a conductor 101, and the $\overline{\text{R}}$ ($\overline{\text{reset}}$) input (FIG. 14) is supplied to terminal *d*. A feedback connection 102 connects to the output of delay circuit 30 with terminal *c*.

The operation of the $\overline{\text{RS}}$ flip-flop with set override is mathematically represented by the formula:

$$Q=\overline{\overline{S}} \,\&\, \overline{R}q$$

The truth table for the $\overline{\text{RS}}$ flip-flop with a set override is as follows:

| q | S | R | Q |
|---|---|---|---|
| 0 | 0 | 0 | 1 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 0 |
| 1 | 1 | 1 | 1 |

The operation of the $\overline{\text{RS}}$ flip-flop is similar to the operation of the RS flip-flop. Both provide the same logic function (i.e., that of a set override RS flip-flop). The RS flip-flop operates with R and S inputs, while the $\overline{\text{RS}}$ flip-flop operates with complemented R ($\overline{\text{R}}$) and complemented S ($\overline{\text{S}}$) inputs. In operation, the input signals are inverted, the feedback signal is taken from the output of delay circuit 30 instead of inverter 35, and the input connections are different.

The $\overline{\text{RS}}$ flip-flop may also be used as a $\overline{\text{RS}}$ flip-flop with reset override. In this case input $\overline{\text{R}}$ (FIG. 15) is applied to terminal *a* and input $\overline{\text{S}}$ (FIG. 15) is applied to terminal *d*. The output Q is taken from terminal *f* and the output $\overline{Q}$ is taken from terminal *e*. In all other respects the $\overline{\text{RS}}$ flip-flop remains the same.

The operation of $\overline{\text{RS}}$ flip-flop with reset override is mathematically represented by the following formula:

$$Q=\overline{\overline{R}+\overline{S}\,\overline{q}}$$

where $\overline{\text{S}}$ (FIG. 15) represents the signal on terminal *d* and $\overline{\text{R}}$ (FIG. 15) represents the signal on terminal *a*. the truth table for the $\overline{\text{RS}}$ flip-flop with reset override is as follows:

| $\bar{q}$ | $\overline{\text{S}}$ | $\overline{\text{R}}$ | Q |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 1 |
| 1 | 1 | 0 | 0 |
| 1 | 1 | 1 | 0 |

The operation of the $\overline{\text{RS}}$ flip-flop with reset override is similar to the operation of the $\overline{\text{RS}}$ flip-flop with set override, except that when $\overline{\text{R}}$ and $\overline{\text{S}}$ are ZEROES the Q output is reset to a ZERO.

FIG. 16.—SAMPLE AND HOLD FLIP-FLOP

Illustrated in FIG. 16 is the logic module connected to perform the sample and hold flip-flop function. If the sample input is a ZERO, then the outputs of the sample and hold flip-flop circuit will be held at their prior states. On the other hand, should the sample input be a ONE, then the flip-flop is set according to a data input after a one bit delay.

The sample input (FIG. 17) is supplied to terminal *a* and the data input (FIG. 17) is supplied to terminal *d*. A conductor 111 interconnects input *a* of NOR circuit 11 with input *c* of AND circuit 25. A feedback connection 112 connects the output of inverter 35 with the other input *b* of NOR circuit 11.

The operation of the sample and hold flip-flop is represented mathematically by the formula:

$$Q=\text{Sample}\cdot\text{Data}+\overline{\text{Sample} \,\&\, \overline{q}}$$

A truth table for the sample and hold flip-flop is as follows:

| $\bar{q}$ | Sample | Data | Q |
|---|---|---|---|
| 0 | 0 | 0 | 1 |
| 0 | 0 | 1 | 1 |
| 0 | 1 | 0 | 0 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

Assume output $\bar{q}$ is a ZERO, the data input is a ONE, and the sample input is a ZERO. Then the output Q should remain the same. The output of the NOR circuit will be a ONE and the output of AND circuit 25 will be a ZERO. Thereupon the output of OR circuit 20 will be a ONE. After delay, circuit 30 transmits a ONE output (Q) at terminal *e*.

Now assume that output $\overline{q}$ is a ONE, the sample input is a ZERO, and the data input is a ONE. The output of NOR circuit 11 will be a ZERO while the output of AND circuit 25 also will be a ZERO. After delay, circuit 30 transmits a ZERO output (Q) on terminal *e*.

Now assume that the data input is a ONE and the sample input is a ONE. The feedback signal $\overline{q}$ may be either a ZERO or a ONE. Therefore the data input, which is a ONE, should be advanced after delay. NOR circuit 11 produces a ZERO in its output while AND circuit 25 produces a ONE in its output. Thereupon OR circuit 20 produces a ONE output. After delay, a logic ONE appears on terminal *e*(Q). Therefore, the ONE data input is advanced when the sample is a one.

Assume the data input is a ZERO and the sample input is a ONE. The output of NOR circuit 11 will be a ZERO and the output of AND circuit 25 also will be a ZERO. The output of OR circuit 20 will be a ZERO. After delay, circuit 30 supplies a ZERO on terminal *e*. Therefore the ZERO data input is advanced when the sample input is a ONE. Thus it can be seen that the sample and hold flip-flop will be set or reset by the data input when the sample input is a ONE.

FIG. 18.—INVERTED INPUT SAMPLE AND HOLD FLIP-FLOP

Illustrated in FIG. 18 is an inverted input sample and hold flip-flop. In this flip-flop, the $\overline{\text{sample}}$ input (FIG. 19) is supplied to terminal *a* and the $\overline{\text{data}}$ input (FIG. 19) is supplied to terminal *b*. Terminal *a* is connected to terminal *c* by a conductor 121 so that the $\overline{\text{sample}}$ input is also fed to an input of AND circuit 25. A feedback connection 122 connects the output of delay circuit 30 with terminal *d*. In this circuit when the $\overline{\text{sample}}$ input is a ZERO, the $\overline{\text{data}}$ is advanced after delay and appears on terminal *f* ($\overline{\text{Q}}$). When the $\overline{\text{sample}}$ input is a ONE the output on terminal *e* ($\overline{\text{Q}}$) is unchanged.

The operation of the inverted input sample and hold flip-flop is mathematically represented by the formula:

$$Q=\overline{\overline{\text{Sample}}+\overline{\text{Data}}}+\overline{\text{Sample}}\cdot q$$

The truth table is as follows:

| q | $\overline{\text{Sample}}$ | $\overline{\text{Data}}$ | Q |
|---|---|---|---|
| 0 | 0 | 0 | 1 |
| 0 | 0 | 1 | 0 |
| 0 | 1 | 0 | 0 |
| 0 | 1 | 1 | 0 |
| 1 | 0 | 0 | 1 |
| 1 | 0 | 1 | 0 |
| 1 | 1 | 0 | 1 |
| 1 | 1 | 1 | 1 |

The operation is similar to the operation of the sample and hold flip-flop. The input sample and data signals are inverted, the data input is supplied to the *b* input instead of the *d* input, and the feedback signal (*q*) is taken from delay circuit 30 instead of inverter 35 and is connected to the *d* input instead of the *b* input.

FIG. 20.—ONE BIT DELAY FLIP-FLOP

Illustrated in FIG. 20 is the logic module connected to form a one-bit delay flip-flop. In this case a conductor 131 interconnects terminals *a*, *b*, and *c*. A ONE signal is continuously supplied to terminal *a*; thus a ONE will be supplied to both inputs of NOR circuit 11 and one input of AND circuit 25. The input signal, designated D, is supplied to terminal *d* (the other input of AND circuit 25). The input signal D will be delayed one bit time and thereafter supplied on output *e*.

The operation of the one-bit delay flip-flop is represented mathematically by the formula:

$$Q=D$$

A truth table for flip-flop is as follows:

| q | D | Q |
|---|---|---|
| 0 | 0 | 0 |
| 0 | 1 | 1 |
| 1 | 0 | 0 |
| 1 | 1 | 1 |

If the D input is a ONE, then a ZERO appears at the output of NOR circuit 11 and a ONE appears at the output of AND circuit 25. Therefor OR circuit 20 produces a ONE output which is transmitted to delay circuit 30. After delay, circuit 30 transmits the ONE on terminal *e*.

Now assume that the D input is a ZERO. Thereupon a ZERO appears at the output of NOR circuit 11 and a ZERO appears at the output of AND circuit 25. A ZERO is transmitted to delay circuit 30. Circuit 30 supplies the ZERO at terminal *e* after delay.

FIG. 22.—ONE BIT DELAY COMPARATOR

Illustrated in FIG. 22 is the logic module connected to perform the one-bit delay AB comparator function. In a one-bit delay AB comparator, two inputs, A and B, are compared. If A and B are of the same logic value, the output Q will be a ONE. Should the input signals be of different logic value, the output will be a ZERO. The output is always delayed by one bit time.

Terminal *a* is connected to terminal *c* by a conductor 141, and terminal *b* is connected to terminal *d* by a conductor 142. Input A is supplied to terminal *a* and input signal B is supplied to terminal *d*.

The operation of the one-bit delay AB comparator is represented mathematically as follows:

$$Q=\overline{A+B}+AB$$

A truth table showing the operation of the comparator is as follows:

| A | B | Q |
|---|---|---|
| 0 | 0 | 1 |
| 0 | 1 | 0 |
| 1 | 0 | 0 |
| 1 | 1 | 1 |

Assume that the A and B inputs are to be compared and both are ZEROS. Then the output of NOR circuit 11 will be a ONE and the output of AND circuit 25 will be a ZERO. Thereupon the output of OR circuit 20 will be a ONE. After delay, circuit 30 transmits the ONE on terminal *e* (Q). Thus the comparator produces a ONE output when signals A and B are both ZERO.

Now assume that A and B are both ONES. The output produced by NOR circuit 11 will be a zero and the output of AND circuit 25 will be a ONE. OR circuit 20 supplies a ONE output. After delay, circuit 30 transmits a ONE on terminal *e*. Thus the comparator also produces a ONE output when inputs A and B are both ONES.

Assumed that A is a ZERO and B is a ONE. Then NOR circuit 11 will produce a ZERO output and the output and output of AND circuit 25 will also be a ZERO. In response OR circuit 20 produces a ZERO output. After delay, circuit 30 transmits a ZERO output which delay circuit 30 thereafter transmits to terminal *e*. Thus the comparator produces a ZERO output when A and B are logically opposite.

Next assume that A is a ONE and B is a ZERO. The output of NOR circuit 11 will be a ZERO and the output of AND circuit 25 will also be a ZERO. As a consequence, the output of OR circuit 20 will be a ZERO. After delay, circuit 30 transmits the ZERO on terminal *e*. Thus when A and B have different polarities, a ZERO output is supplied.

Illustrated in FIG. 24 are input signals which will produce a one-bit delay $\overline{A}B$ comparator function from the circuit shown in FIG. 22. The $\overline{A}$ input is supplied to terminal *a* and the output (Q) is taken from terminal *e*. The mathematical formula representing the operation of the $\overline{A}$B comparator is as follows:

$$A=\overline{\overline{A}}+\overline{B}+\overline{A}B$$

The truth table for the $\overline{A}$B comparator is as follows:

| $\overline{A}$ | B | Q |
|---|---|---|
| 0 | 0 | 0 |
| 0 | 1 | 1 |
| 1 | 0 | 1 |
| 1 | 1 | 0 |

FIG. 25.—ONE BIT DELAY TWO STREAM SELECTOR

Illustrated in FIG. 25 is the logic module connected to perform the one-bit delay two-stream selector function. This type of circuit selects between two input signals according to certain logic. Depending on the state of the B input, either the A input or the inverse of the C input is selected. For example, if the B input is a ZERO, the output on terminal *e* (Q) is $\overline{C}$. If the B input is a ONE, then the Q output will be the same as the A input.

For this circuit, terminal *b* is connected to terminal *c* by a conductor 151. The C input (FIG. 26) is supplied to terminal *a*, the B input (FIG. 26) is supplied to terminal *b*, and the A input (FIG. 26) is supplied to terminal *d*.

The operation of the two-stream selector is represented mathematically by the formula:

$$Q=\overline{C+B}+BA$$

A truth table showing the operation of the selector is as follows:

| A | B | C | Q |
|---|---|---|---|
| 0 | 0 | 0 | 1 |
| 0 | 0 | 1 | 0 |
| 0 | 1 | 0 | 0 |
| 0 | 1 | 1 | 0 |
| 1 | 0 | 0 | 1 |
| 1 | 0 | 1 | 0 |
| 1 | 1 | 0 | 1 |
| 1 | 1 | 1 | 1 |

Assume that B is a ZERO, C is a ZERO and A is a ZERO. The output produced by NOR circuit 11 will be a ONE and the output produced by AND circuit 25 will be a ZERO. The output transmitted by OR circuit 20 will be a ONE. Delay circuit 30 thereafter supplies the ONE, representing $\overline{C}$, on terminal *e*.

Next assume that the B input is again a ZERO, the C input is now a ONE, and the A input remains a ZERO. Then the output of NOR circuit 11 will be a ZERO and the output of AND circuit 25 will also be a ZERO. A ZERO output will be produced by OR circuit 20. After delay circuit 30 transmits the ZERO, or $\overline{C}$, on terminal *e*.

Now assume the B input is a ONE, the A input is a ZERO, and the C input is a ZERO. Then the output of NOR circuit 11 and AND circuit 25 will be a ZERO. A ZERO output will be produced by OR circuit 20 which circuit 30 will transmit on output terminal *e* after delay. Thus the A input will be transmitted to the output in response to a B input of ONE.

Assume now that the B input is again a ONE and the A input also is a ONE. The C input may remain a ZERO. The output of NOR circuit 11 will be a ZERO and the output of AND circuit 25 will be a ONE. The output of OR circuit 20 will be a ONE. After delay, circuit 30 will transmit the ONE on terminal *e*. Thus the output is again the same as the A input.

FIG. 27.—CIRCUIT DIAGRAM

Figure 27:
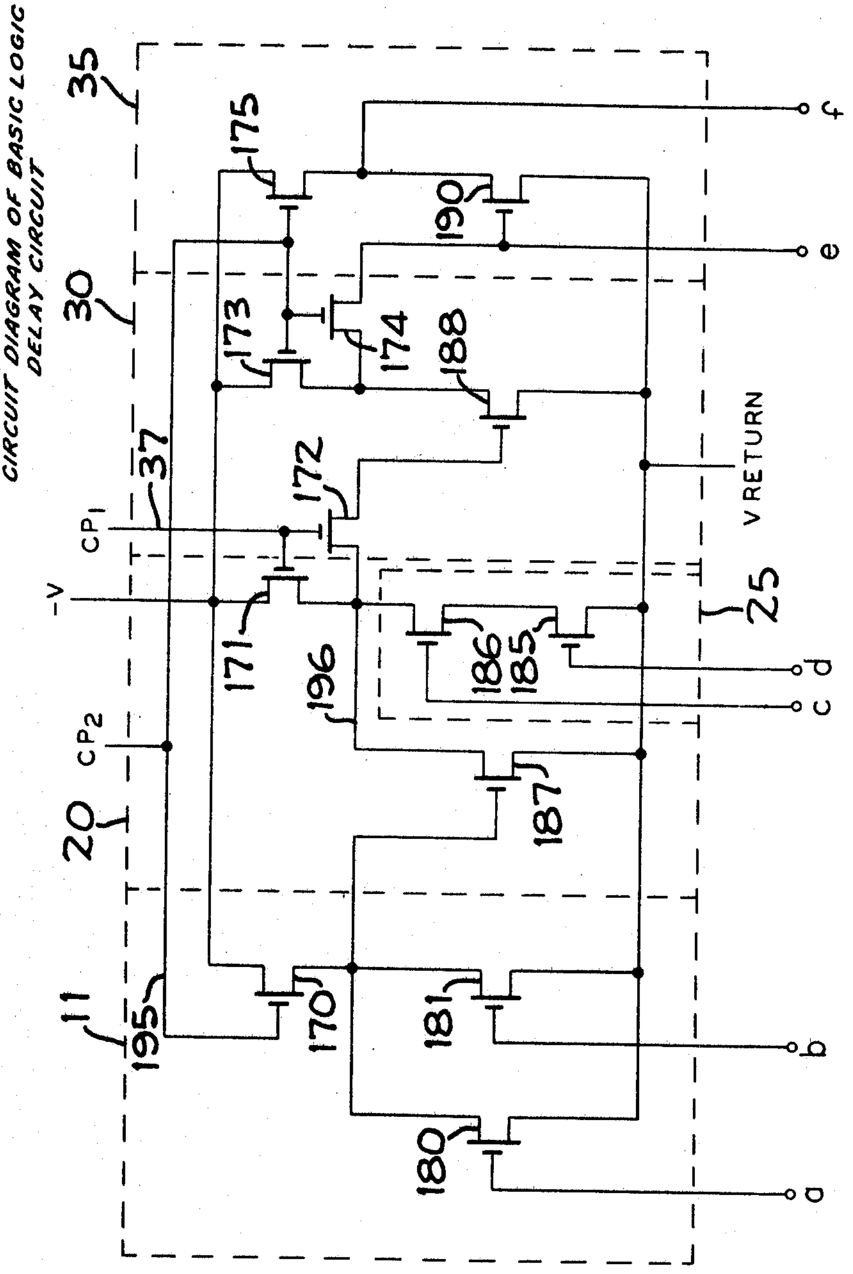
FIG. 27 is a schematic diagram of the logic module when constructed of insulated gate field-effect transistors.

In FIG. 27 is illustrated one preferred circuit for the logic module. The circuit is of monolithic structure and employs insulated gate field-effect transistors. A unique configuration is employed, which requires only thirteen transistors. The field-effect transistors may be either PNP or NPN devices. In the exemplary embodiment, PNP devices are used. These require that a negative voltage (—V) be applied to the drain electrodes of devices 170, 171, 173, and 175. NPN devices would require a positive potential.

The circuit operates synchronously in response to non-overlapping, two-phase clock pulses $CP_1$ and $CP_2$. All inputs and internal switching of the transistors occurs during the clock pulses. The clock pulses must be of the same polarity as the potential applied to the drain electrodes of transistors 170, 171, 173, and 175 and must be of sufficient amplitude to cause these transistors to conduct.

Transistors 170, 180, and 181 form NOR circuit 11. Input terminal *a* is connected to gate electrode of transistor 180 and input terminal *b* is connected to the gate electrode of transistor 181. Transistors 185 and 186 form AND circuit 25. Terminal *c* is connected to the gate electrode of the transistor 186 and terminal *d* is connected to the gate electrode of transistor 185.

Transistors 187, 171, 185, and 186 collectively form AND circuit 25 and OR circuit 20. Transistors 171–174 and 185–188 collectively form AND circuit 25, OR circuit 20, and delay circuit 30. Inverter 35 is formed by transistors 175 and 190. Terminal *e* is connected to the source electrode of transistor 174 and the gate electrode of transistor 190 and terminal *f* is connected to the source electrode of transistor 175 and the drain electrode transistor 190.

Transistor 170 is a load transistor and has its source electrode connected to the drain electrodes of transistors 180 and 181. Connected to the gate electrode of transistor 170 is a conductor 195 over which are transmitted clock pulses $CP_2$. Transistor 170 must conduct before transistor 180 or transistor 181 can conduct. Therefore, transistors 180 and 181 are capable of conducting only when a $CP_2$ clock pulse is supplied.

If the potentials applied to the input terminals *a* and *b* are ZEROES and the clock pulses $CP_2$ reach sufficient pulse amplitude for driving transistor 170 into conduction, then transistor 170 will conduct, and the output node of NOR circuit 11 (the gate of transistor 187) will supply a ONE or near —V potential. When clock pulse $CP_2$ returns to ground, the output node of NOR circuit 11 will remain at a ONE since charge is stored by the gate capacity of transistor 187. No current will flow from the node since the gate impedance of the transistor 187 is extremely high and transistors 170, 180, and 181 are now cut off.

During a succeeding clock pulse when $CP_2$ goes to ONE, if terminals *a* or *b*, or both, receive a ONE, the transistor or transistors receiving a ONE will conduct, and the output node of NOR circuit 11 will be a ZERO (near ground potential) since transistors 180 and 181 have a much higher transconductance than does transistor 170. When the clock pulse returns to near ground, the output node of NOR circuit 11 will remain at a ZERO since no current will flow through transistors 170, 180, and 181 and the gate impedance of transistor 187 is extremely high. The charge stored on the gate of the transistor 187 will remain until the switching under control of clock pulse $CP_2$ occurs.

Connected to the gate of the transistor 171 is conductor 37 over which are transmitted clock pulses $CP_1$. Transistors 185 and 186 must conduct simultaneously during a $CP_1$ clock pulse to enable transistor 171 to conduct. Thus transistors 185, 186, and 171 can conduct only when ONES are supplied to both terminals *c* and *d* and a $CP_1$ clock pulse is supplied.

Node 196 will go to a ZERO when transistor 187 or transistors 186 and 185 are conducting during $CP_1$ clock pulse. During a $CP_1$ clock pulse, transistor 172 will also conduct and connect the gate electrode of transistor 188 to node 196.

Conductor 195, which is also connected to the gate electrodes of transistors 173 and 174, receives $CP_2$ clock pulses. The signal of node 196 is capable of being stored on the gate electrode of transistor 188. Since the output node of transistors 188, 173, and 174 (terminal *e*) can only change during a $CP_2$ clock pulse, there is a one bit delay between the output of delay circuit 30 and the application of input signals on terminals *a, b, c,* and *d.*

The output of delay circuit 30 is supplied to the gate of transistor 190 for controlling the conduction thereof. Transistor 175 is the load for transistor 190. Clock pulses $CP_2$ are supplied to the gate electrode of transistor 175 to control the conduction thereof. Transistor 175 must conduct simultaneously before transistor 190 may conduct. Thus if a ONE is supplied to the gate electrode of transistor 190, it will cause transistor 190 to conduct during a $CP_2$ clock pulse to transmit a ZERO to terminal *f*. Conversely, a ZERO on terminal *e* will cut off transistor 190 during a $CP_2$ clock pulse, causing a ONE to be supplied at terminal *f*.

We claim:

1. A logic circuit module for receiving and processing binary logic signals which undergo value changes in synchronism with a periodic clock signal, comprising:

a NOR circuit having a plurality of inputs and an output, an AND circuit having a plurality of inputs and an output, an OR circuit having a plurality of inputs and an output, means connecting (1) the output of said NOR circuit to one input of said OR circuit and (2) the output of said AND circuit to the other input of said OR circuit, a time delay circuit, having an input connected to the output of said OR circuit, for supplying at its output in response to each received binary input signal, a like-valued binary output signal which is delayed by the period of said clock signal, and an inverter, having an input connected to the output of said time delay circuit, for supplying at its output in response to each received binary input signal, a non-delayed, opposite-valued binary output signal.

2. The logic circuit of claim 1 further including means connecting one of the inputs of said NOR circuit with one of the inputs of said AND circuit and means connecting another of the inputs of said NOR circuit with another of the inputs of said AND circuit.

3. The logic circuit of claim 1 further including a feedback circuit connected between the output of said inverter and one of the inputs of said NOR circuit.

4. The logic circuit of claim 3 further including means connecting one of said inputs of said AND circuit with another input of said AND circuit.

5. The logic circuit of claim 3 further including means connecting another input of said NOR circuit with one input of said AND circuit.

6. The logic circuit of claim 1 further including a feedback circuit connected between the output of said inverter and one of the inputs of said AND circuit.

7. The logic circuit of claim 1 further including a feedback circuit connected from the output of said inverter to one of the inputs of said NOR circuit and one of the inputs of said AND circuit.

8. The logic circuit of claim 7 further including means connecting another input of said NOR circuit with another input of said AND circuit.

9. The logic circuit of claim 1 further including means connecting one of the inputs of said NOR circuit with one of the inputs of said AND circuit.

10. The logic circuit of claim 9 further including means connecting another of said inputs of said NOR circuit with another of said inputs of said AND circuit.

11. The logic circuit of claim 1 wherein said NOR circuit, said AND circuit, said OR circuit, said delay circuit, and said inverter are formed from insulated gate field-effect devices.

12. The logic circuit of claim 11 wherein said field-effect transistors constitute a monolithic structure.

13. The logic circuit of claim 1 further including a feedback connection connected to the output of said delay circuit and one of the inputs of said NOR circuit.

14. The logic circuit of claim 1 further including a feedback connection connected to the output of said delay circuit and one of the inputs of said NOR circuit and one of the inputs of said AND circuit.

15. The logic circuit of claim 14 further including means connecting another input of said NOR circuit with another input of said AND circuit.

16. The logic circuit of claim 1 further including a feedback connection connected between the output of said delay circuit and one of the inputs of said AND circuit.

17. The logic circuit of claim 16 further including means connecting the inputs of said NOR circuit.

18. The logic circuit of claim 16 further including means connecting another input of said AND circuit with one of the inputs of said NOR circuit.

19. The logic circuit of claim 1 further including means connecting the inputs of said NOR circuit and one of the inputs of said AND circuit.

References Cited

UNITED STATES PATENTS 3,171,972 3/1965 Wilkinson -------- 307—292 X

DONALD D. FORRER, Primary Examiner

D. M. CARTER, Assistant Examiner

U.S. Cl. X.R.

307—205, 207, 208, 269, 272; 308—63